United States Patent
Li

(10) Patent No.: US 11,605,822 B2
(45) Date of Patent: Mar. 14, 2023

(54) FUEL CELL SEPARATOR AND SINGLE FUEL CELL

(71) Applicant: TOYOTA JIDOSHA KABUSHIKI KAISHA, Toyota (JP)

(72) Inventor: Hua Li, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 388 days.

(21) Appl. No.: 16/891,230

(22) Filed: Jun. 3, 2020

(65) Prior Publication Data

US 2021/0050604 A1 Feb. 18, 2021

(30) Foreign Application Priority Data

Aug. 13, 2019 (JP) .............................. JP2019-148401

(51) Int. Cl.
*H01M 8/0258* (2016.01)
*H01M 8/0267* (2016.01)

(52) U.S. Cl.
CPC ....... *H01M 8/0258* (2013.01); *H01M 8/0267* (2013.01)

(58) Field of Classification Search
CPC ............. H01M 8/0258; H01M 8/0267; H01M 8/0265; H01M 2008/1095; H01M 8/1007; Y02E 60/50
See application file for complete search history.

(56) References Cited

U.S. PATENT DOCUMENTS

| | | | | |
|---|---|---|---|---|
| 6,586,128 B1* | 7/2003 | Johnson | .............. | H01M 8/0265 429/513 |
| 11,152,627 B2* | 10/2021 | Lösche-Ter Horst | ......... | H01M 8/0265 |
| 2003/0077501 A1* | 4/2003 | Knights | .............. | H01M 8/0265 429/435 |
| 2007/0154747 A1* | 7/2007 | Darling | ............. | H01M 8/04134 429/513 |
| 2010/0273084 A1* | 10/2010 | Shimomura | ........ | H01M 8/0258 429/483 |
| 2014/0141350 A1* | 5/2014 | Hamada | .............. | H01M 8/1004 429/434 |

FOREIGN PATENT DOCUMENTS

| | | |
|---|---|---|
| JP | 2005-116179 | 4/2005 |
| JP | 2006-114387 | 4/2006 |
| JP | 2007-149358 | 6/2007 |
| JP | 2008-171638 | 7/2008 |
| JP | 2017-191687 | 10/2017 |
| WO | WO 2011/090246 | 7/2011 |

\* cited by examiner

*Primary Examiner* — Muhammad S Siddiquee
(74) *Attorney, Agent, or Firm* — Finnegan, Henderson, Farabow, Garrett & Dunner, LLP

(57) ABSTRACT

A fuel cell separator includes ribs. The fuel cell separator has a plurality of gas flow paths separated from each other by the ribs. The fuel cell separator has, on a surface of the ribs on the gas flow path side, a liquid water flow path provided separately from the gas flow paths along the gas flow paths. The liquid water flow path has an expanded region in which a cross-sectional area of the liquid water flow path in a direction perpendicular to a flow direction of the liquid water flow path is larger than a cross-sectional area of the liquid water flow path in the direction perpendicular to the flow direction in a remaining region of the liquid water flow path.

5 Claims, 6 Drawing Sheets

FUEL CELL SEPARATOR AND SINGLE FUEL CELL

INCORPORATION BY REFERENCE

The disclosure of Japanese Patent Application No. 2019-148401 filed on Aug. 13, 2019 including the specification, drawings and abstract is incorporated herein by reference in its entirety.

BACKGROUND

1. Technical Field

The present disclosure relates to a fuel cell separator and a single fuel cell.

2. Description of Related Art

As a configuration of a single fuel cell, a configuration in which a membrane electrode assembly, a gas diffusion layer, and a separator are stacked is known. Here, the separator has gas flow paths that allow a reaction gas, that is, a cathode gas or an anode gas, to flow in the single fuel cell.

In the single fuel cell having the above configuration, liquid water such as water generated by a cell reaction enters the gas flow paths, blocking the gas flow paths. This may cause a decrease in the flow efficiency of gas in the single fuel cell and hence a decrease in the power generation efficiency, and/or flooding.

In view of such possibilities, to efficiently discharge the liquid water from the inside of the single fuel cell, studies have been made to optimize the shape of the gas flow paths, the roughness of grooves of the separator, which constitute the gas flow paths, gas loss pressure, and the like.

In this regard, WO 2011/090246 discloses a fuel cell separator having a plurality of gas flow paths separated from each other by ribs. The fuel cell separator has a configuration in which a rib portion is provided with a liquid flow path for discharging generated water and increasing the residence time of reaction gas to increase the reaction efficiency.

Japanese Unexamined Patent Application Publication No. 2007-149358 (JP 2007-149358 A) discloses a fuel cell separator having a first flow path formed on a front surface of the fuel cell separator and a second flow path formed on a back surface of the fuel cell separator. The first flow path has a plurality of first main flow paths and a first sub flow path that communicates the fluid between the first main flow paths, and the second flow path has a plurality of second main flow paths and a second sub flow path that communicates the fluid between the second main flow paths.

Japanese Unexamined Patent Application Publication No. 2008-171638 (JP 2008-171638 A) discloses a fuel cell separator having first and second flow paths extending parallel to each other and adjacent to each other, and a third flow path that communicates the fluid between the first and second flow paths. The third flow path is inclined and smaller with respect to the first and second flow paths.

Japanese Unexamined Patent Application Publication No. 2005-116179 (JP 2005-116179 A) discloses a fuel cell having a gas diffusion electrode disposed on both sides of an electrolyte membrane, a separator having ribs disposed adjacent to the gas diffusion electrode and contacting the gas diffusion electrode at a contacting surface of the ribs, and groove-shaped gas flow paths formed between the ribs. In such a fuel cell, a hydrophilic portion is formed in a part of a surface of the ribs contacting the gas diffusion electrode and a part of a groove surface that forms the gas flow path, by performing a hydrophilic treatment such that the above parts communicate with each other.

Japanese Unexamined Patent Application Publication No. 2006-114387 (JP 2006-114387 A) discloses a fuel cell having a power generation cell having an electrolyte membrane and a separator facing the power generation cell. On the surface of the separator on the power generation cell side, gas flow paths are provided in which a plurality of groove-shaped flow paths through which fuel gas or oxidizing gas flows are formed in a stripe shape. A cross-sectional area of at least a part of each of the groove-shaped flow paths continuously increases or decreases in a length direction of the groove-shaped flow paths, and a change in the cross-sectional area of the adjacent groove-shaped flow paths is reversed.

Further, Japanese Unexamined Patent Application Publication No. 2017-191687 (JP 2017-191687 A) discloses a fuel cell having at least a gas flow path forming member disposed between a gas diffusion layer and a separator. The gas flow path forming member has gas flow paths opened to the gas diffusion layer side and water flow paths opened to the separator side. A part of each of the gas flow paths opened to the gas diffusion layer side has a narrow portion in which a cross section of the gas flow paths is narrowed. The narrow portion has a communication portion that connects the gas flow path and the water flow path.

SUMMARY

As described above regarding the single fuel cell, it is required to suppress a decrease in power generation efficiency of the single fuel cell and an occurrence of flooding due to blockage of the gas flow path by liquid water such as liquid water generated by a cell reaction, and various techniques for that purpose have been proposed.

There is a need to further suppress the decrease in the power generation efficiency of the single fuel cell and the occurrence of flooding.

The inventor of the present disclosure has studied to further reduce the flooding and the decrease in the power generation performance using a configuration in which the liquid water flow path is provided on the ribs to allow liquid water to flow in the liquid water flow path as in the fuel cell separator disclosed in WO 2011/090246, so as to reduce the liquid water flowing in the gas flow paths and suppress the blockage of the gas flow paths.

The present disclosure provides a fuel cell separator and a single fuel cell that can reduce flooding, a decrease in power generation performance, and the like.

A first aspect of the disclosure relates to a fuel cell separator. The fuel cell separator includes ribs. The fuel cell separator has a plurality of gas flow paths separated from each other by the ribs. The fuel cell separator has liquid water flow paths. The liquid water flow paths are provided on a surface of the fuel cell separator. The surface of the fuel cell separator on which the liquid water flow paths are provided is a surface on the gas flow path side. Each of the liquid water flow paths is on a surface of a corresponding one of the ribs. The liquid water flow paths are separated from the gas flow paths. The liquid water flow paths extend along the gas flow paths. Each of the liquid water flow paths has an expanded region having a cross-sectional area that is larger than a cross-sectional area of a remaining region of the liquid water flow path that is a region of the liquid water flow path other than the expanded region. Each of the cross-sectional area of the expanded region and the cross-sectional area of the remaining region of the liquid water flow path is an area of a cross-section perpendicular to a flow direction of the liquid water flow path. In the fuel cell separator according to the first aspect, a width of the expanded region may be larger than a width of the remaining region. In the fuel cell separator according to the first aspect, each of the gas flow paths may have a narrow region having a cross-sectional area that is smaller than a cross-sectional area of a remaining region of the gas flow path that is a region of the gas flow path other than the narrow region. Each of the cross-sectional area of the narrow region and the cross-sectional area of the remaining region of the gas flow path is an area of a cross-section perpendicular to a flow direction of the gas flow path. The narrow regions of the gas flow paths may be arranged side-by-side with the expanded regions of the liquid water flow paths. In the fuel cell separator according to the first aspect, the fuel cell separator may be a cathode separator. A second aspect of the disclosure relates to a single fuel cell. The single fuel cell includes the fuel cell separator according to the first aspect, a gas diffusion layer, an electrode catalyst layer, and an electrolyte layer. The fuel cell separator, the gas diffusion layer, the electrode catalyst layer, and the electrolyte layer are stacked in this order.

According to the present disclosure, it is possible to provide a fuel cell separator and a single fuel cell capable of reducing flooding, a decrease in power generation performance, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail. The present disclosure is not limited to the following embodiments, but can be implemented with various modifications within the scope of the present disclosure.

Fuel Cell Separator

A fuel cell separator according to the present disclosure has a plurality of gas flow paths separated from each other by the ribs. The fuel cell separator has liquid water flow paths. The liquid water flow paths are provided on a surface of the fuel cell separator. The surface of the fuel cell separator on which the liquid water flow paths are provided is a surface on the gas flow path side. Each of the liquid water flow paths is on a surface of a corresponding one of the ribs. The liquid water flow paths are separated from the gas flow paths. The liquid water flow paths extend along the gas flow paths. Each of the liquid water flow paths has an expanded region having a cross-sectional area that is larger than a cross-sectional area of a remaining region of the liquid water flow path that is a region of the liquid water flow path other than the expanded region. Each of the cross-sectional area of the expanded region and the cross-sectional area of the remaining region of the liquid water flow path is an area of a cross-section perpendicular to a flow direction of the liquid water flow path. In this specification, "an area of a cross-section which is perpendicular to a flow direction of the liquid water flow path" will be sometimes referred to as "a cross-sectional area in the direction perpendicular to the flow direction".

The fuel cell separator of the present disclosure can further have through holes for a cathode gas manifold, a coolant manifold, and an anode gas manifold.

The material of the fuel cell separator of the present disclosure may be any material that can be used for a separator of a single fuel cell, and may be a gas-impermeable conductive material. Examples of such a material include dense carbon which is made gas-impermeable by compressing carbon, and a pressed metal plate.

The fuel cell separator of the present disclosure may be either a cathode separator or an anode separator. Water is generated by a cell reaction in the single fuel cell on the cathode side of the single fuel cell. Therefore, by using the fuel cell separator of the present disclosure as a cathode separator, a decrease in the power generation efficiency of the single fuel cell and flooding can be further suppressed.

Figure 1:
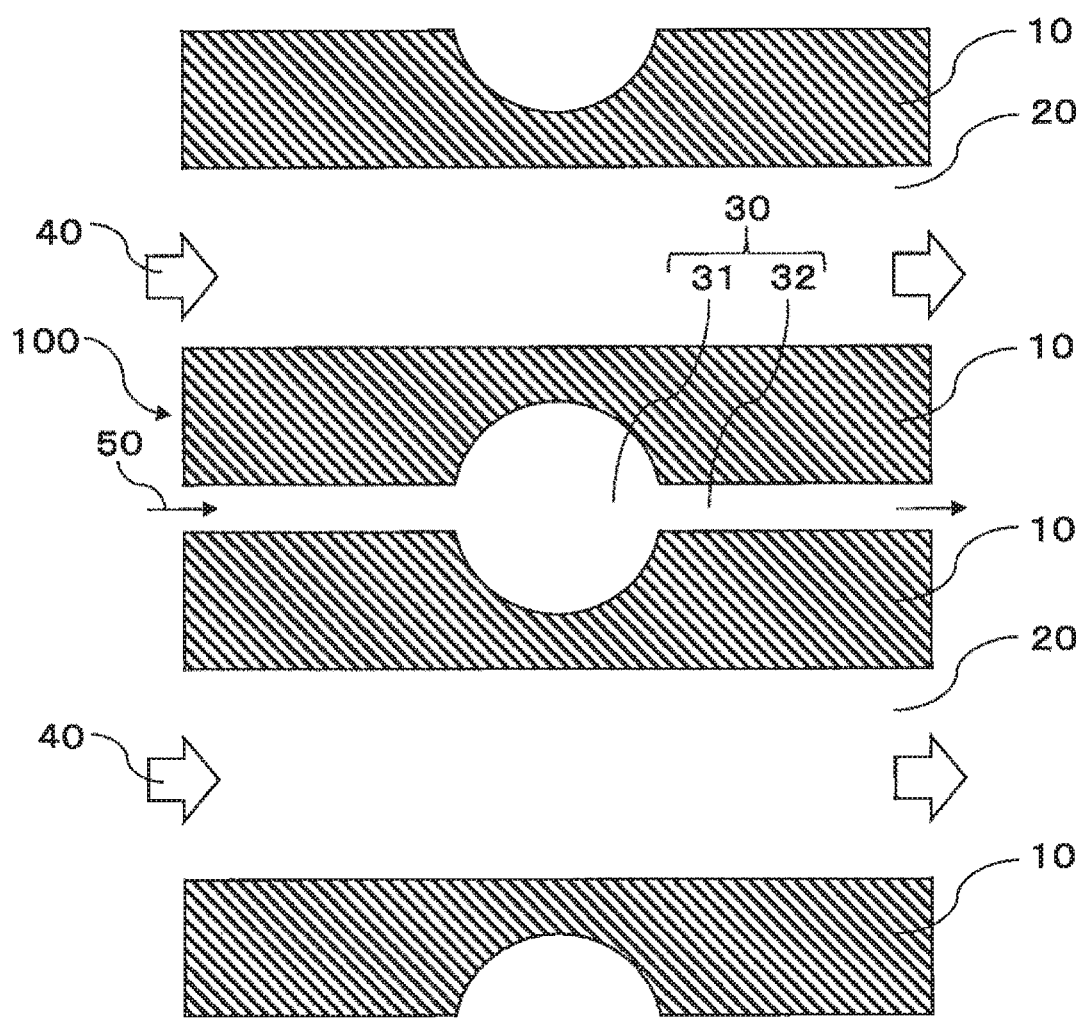
FIG. 1 is a schematic diagram illustrating a liquid water flow path of a fuel cell separator according to a first embodiment of the present disclosure.

FIG. 1 is a schematic diagram illustrating a liquid water flow path of a fuel cell separator 100 according to a first embodiment of the present disclosure.

As shown in FIG. 1, the fuel cell separator 100 according to the first embodiment of the present disclosure has a plurality of gas flow paths 20 separated from each other by ribs 10. The fuel cell separator 100 has liquid water flow paths 30. The liquid water flow paths 30 are provided on a surface of the fuel cell separator 100. The surface of the fuel cell separator 100 on which the liquid water flow paths 30 are provided is a surface on the gas flow path 20 side. Each of the liquid water flow paths 30 is on a surface of a corresponding one of the ribs 10. The liquid water flow paths 30 are separated from the gas flow paths 20. The liquid water flow paths 30 extend along the gas flow paths 20. Each of the liquid water flow paths 30 has an expanded region 31 having a cross-sectional area that is larger than a cross-sectional area of a remaining region 32 of the liquid water flow path 30 that is a region of the liquid water flow path 30 other than the expanded region 31. Each of the cross-sectional area of the expanded region 31 and the cross-sectional area of the remaining region 32 of the liquid water flow path 30 is an area of a cross-section perpendicular to a flow direction of the liquid water flow path 30.

In a single fuel cell using the fuel cell separator 100 according to the first embodiment of the present disclosure, a reaction gas 40, for example, a cathode gas or an anode gas, flows through the gas flow paths 20 to a gas diffusion layer. Then, the reaction gas 40 is discharged to the outside of the single fuel cell. Liquid water 50 such as water generated by a cell reaction flows through the liquid water flow path 30 and is discharged to the outside of the single fuel cell. Part of the reaction gas 40 may flow into the liquid water flow path 30.

Figure 2:
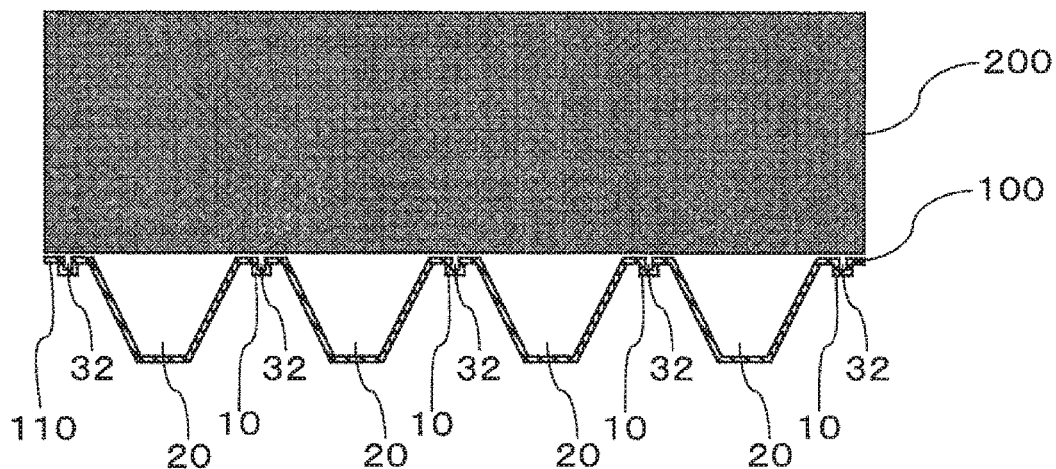
FIG. 2 is a sectional view of the fuel cell separator according to the first embodiment of the present disclosure in a thickness direction of the fuel cell separator, which is in contact with a gas diffusion layer.
Figure 3:
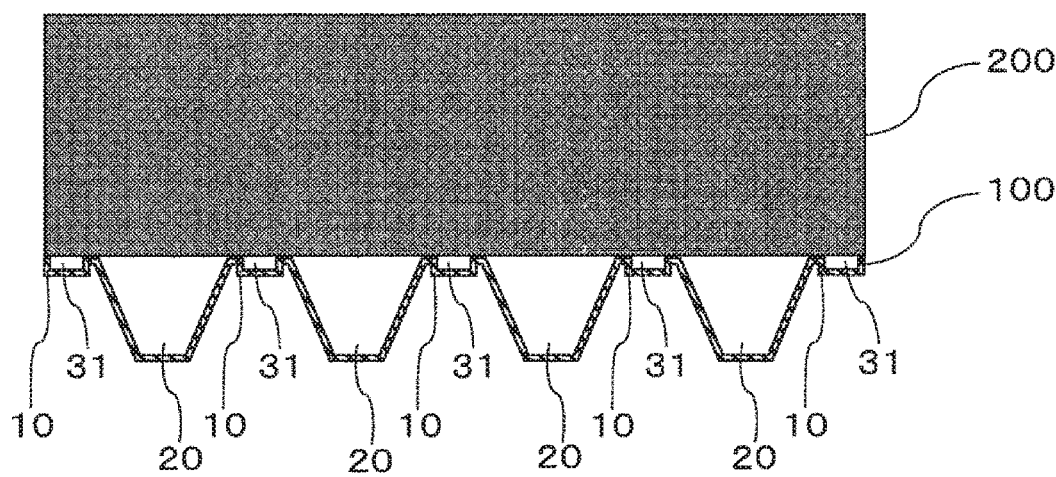
FIG. 3 is a sectional view of the fuel cell separator according to the first embodiment of the present disclosure in the thickness direction of the fuel cell separator, which is in contact with the gas diffusion layer.

FIGS. 2 and 3 are sectional views of the fuel cell separator 100 according to the first embodiment of the present disclosure in a thickness direction of the fuel cell separator 100, which are in contact with the gas diffusion layer 200 in the single fuel cell. FIG. 2 is a sectional view of the liquid water flow path 30 including a region other than the expanded region 31, that is, a sectional view of the liquid water flow path 30 including the remaining region 32. FIG. 3 is a sectional view of the liquid water flow path 30 including the expanded region 31. As shown in FIGS. 2 and 3, in the fuel cell separator 100 according to the first embodiment of the present disclosure, a width of a groove of the liquid water flow path 30 in the expanded region 31 is larger than the width of the groove of the liquid water flow path 30 in the remaining region 32. Thus, the cross-sectional area of the liquid water flow path 30 in the direction perpendicular to the flow direction in the expanded region 31 is larger than the cross-sectional area of the liquid water flow path 30 in the direction perpendicular to the flow direction in the remaining region 32.

Although not limited by principle, the principle by which the fuel cell separator of the present disclosure can reduce the flooding, the decrease in the power generation performance, and the like is as follows.

The inventor of the present disclosure has found that, in the fuel cell separator of the related art having a plurality of gas flow paths separated from each other by ribs and having a liquid water flow path at a portion of the ribs as disclosed in WO 2011/090246, when, for example, the fuel cell is operated at a large current density and the liquid water in the single fuel cell increases, the flow of the liquid water in the liquid water flow path becomes a slag flow (a discontinuous flow including bubbles and the like), water clogging occurs, and pressure loss in the liquid water flow path increases, which may make it difficult to discharge the liquid water to the outside of the single fuel cell through the liquid water flow path.

Figure 4:
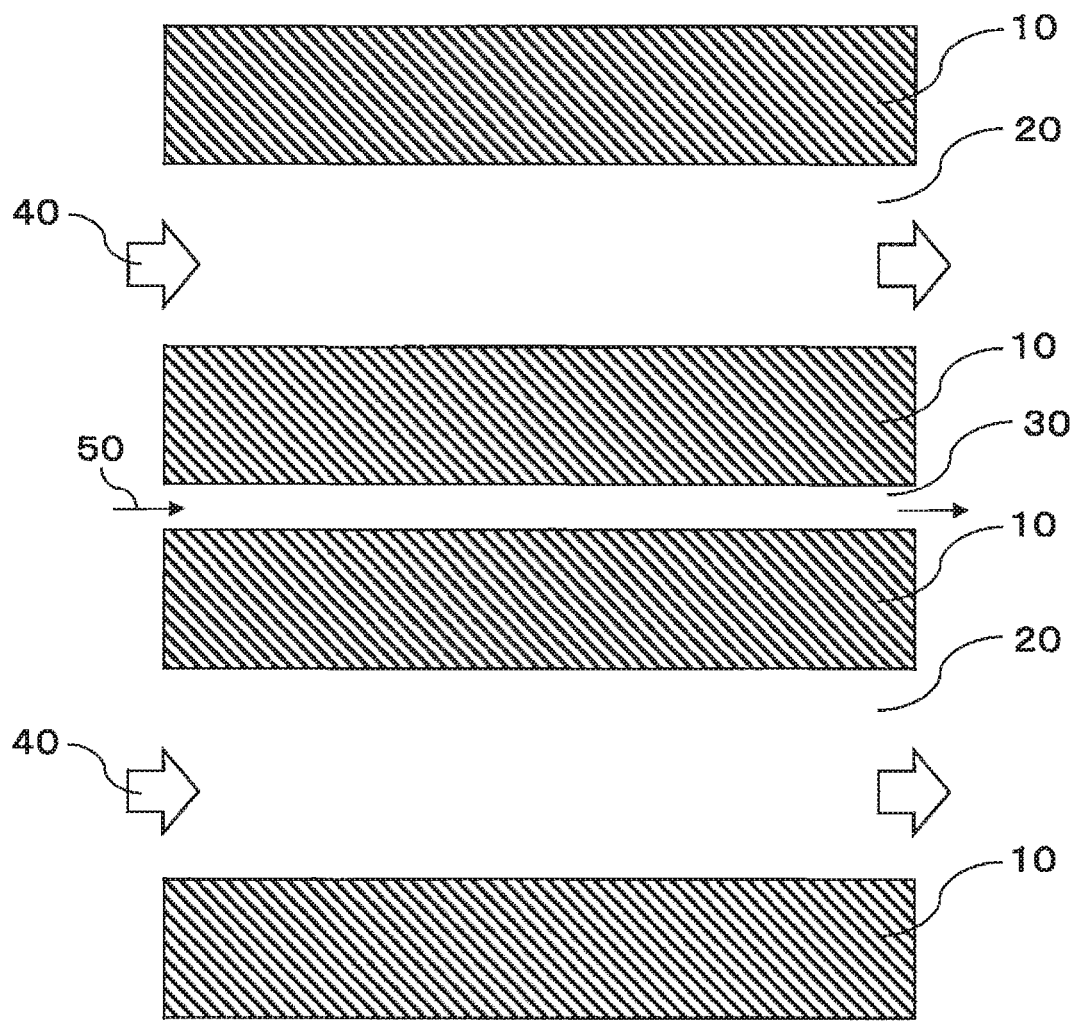
FIG. 4 is a schematic diagram illustrating a liquid water flow path of a fuel cell separator that is different from the fuel cell separator according to the first embodiment of the present disclosure.

More specifically, as shown in FIG. 4, the fuel cell separator 100 of the related art has the gas flow paths 20 separated from each other by the ribs 10, and on the surface of the ribs 10 on the gas flow path 20 side, the liquid water flow path 30 provided separately from the gas flow paths 20 along the gas flow paths 20.

Figure 5:
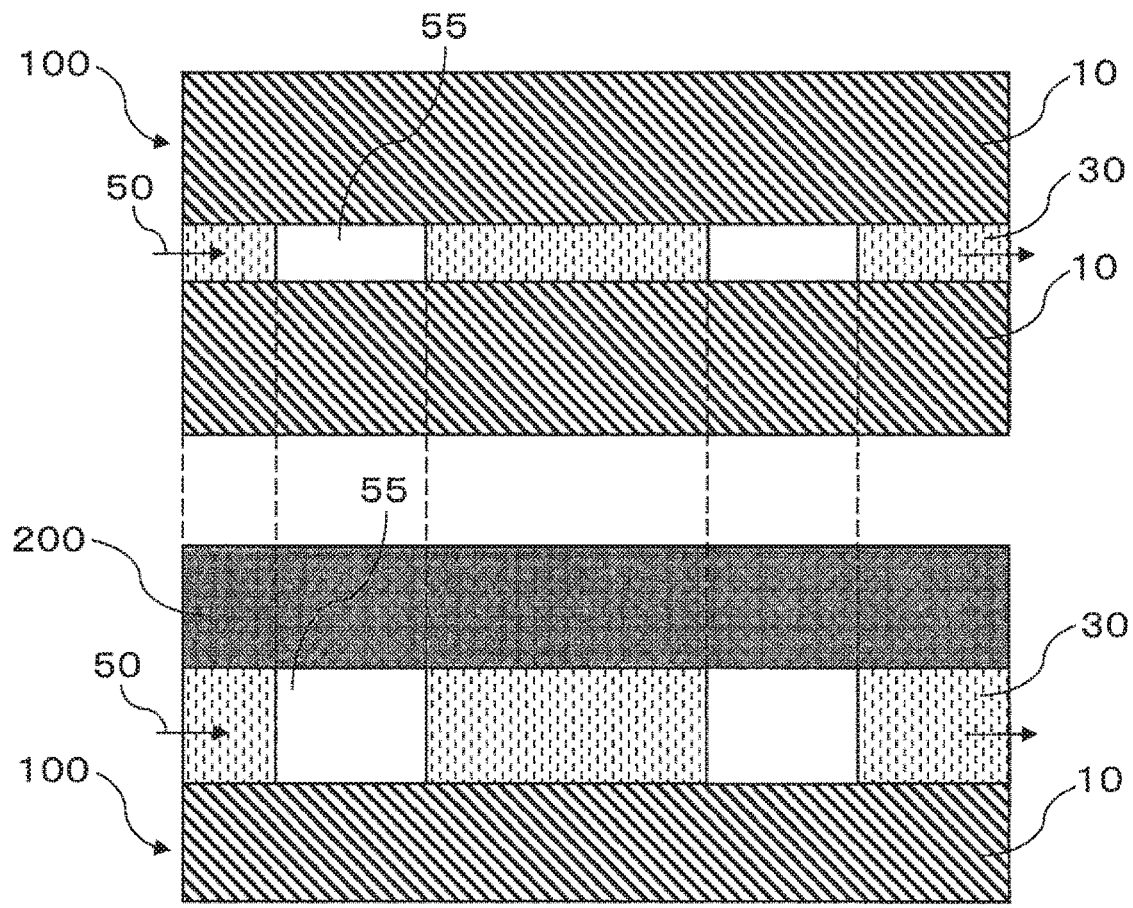
FIG. 5 is a schematic diagram illustrating a state in which liquid water flows in the liquid water flow path of the fuel cell separator that is different from the fuel cell separator according to the first embodiment of the present disclosure.

As shown in FIG. 5, in the single fuel cell having the fuel cell separator 100 having such a configuration, the flow of the liquid water 50 in the liquid water flow path 30 becomes a slag flow when bubbles 55 enter the liquid water flow path 30, which may cause the water clogging and increase the pressure loss.

When the pressure loss increases in the liquid water flow path 30, it becomes difficult to discharge the liquid water to the outside of the single fuel cell through the liquid water flow path 30, which consequently increases an amount of the liquid water flowing into the gas flow paths 20. This may block the gas flow paths 20, causing the decrease in the power generation efficiency of the single fuel cell and flooding to easily occur.

Figure 6:
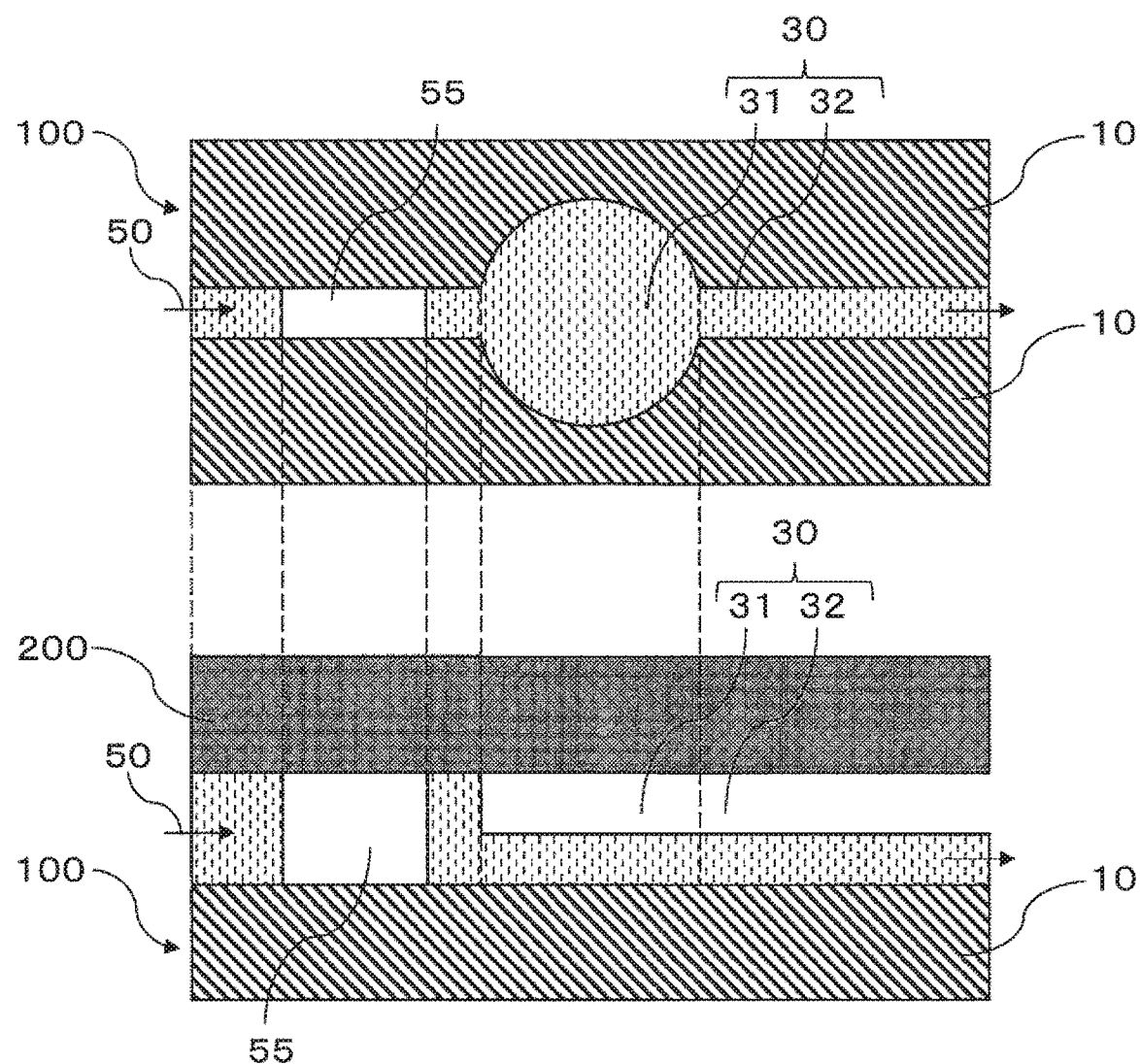
FIG. 6 is a schematic diagram illustrating a state in which liquid water flows in the liquid water flow path of the fuel cell separator according to the first embodiment of the present disclosure.

In contrast, in the fuel cell separator 100 of the present disclosure, for example, as shown in FIG. 6, the liquid water flow path 30 has the expanded region 31 in which the cross-sectional area of the liquid water flow path 30 in the direction perpendicular to the flow direction of the liquid water is larger than the cross-sectional area of the liquid water flow path 30 in the direction perpendicular to the flow direction in the remaining region 32 of the liquid water. Therefore, even when a flow of liquid water 50 including the bubbles 55, that is, a slag flow occurs in the liquid water flow path 30, the liquid water 50 and the bubbles 55 are separated in the expanded region 31 having a large cross-sectional area of the liquid water flow path 30. Thereby, the slag flow changes to an annular flow in the expanded region 31, so that the water clogging in the expanded region 31 and in a downstream thereof can be suppressed.

Thus, the fuel cell separator of the present disclosure can reduce the flooding, the decrease in power generation performance, and the like.

Ribs

The ribs are portions of the fuel cell separator that has a projecting shape on the surface on the gas flow path side, that is, on the surface facing the gas diffusion layer when assembled into the single fuel cell. The ribs separate the gas flow paths from each other.

The ribs have, on its surface on the gas flow path side, the liquid water flow path provided separately from the gas flow paths along the gas flow paths.

The surface on the opposite side of the surface on the gas flow path side with the ribs, that is, the surface facing the outside of the single fuel cell when assembled into the single fuel cell, may have a recessed shape, and may have a refrigerant flow path for cooling the single fuel cell.

Liquid Water Flow Path

The liquid water flow path is provided on the surface of the fuel cell separator on the gas flow path side and on the surface of the ribs, provided separately from the gas flow paths along the gas flow paths. The liquid water flow path has the expanded region in which the cross-sectional area of the liquid water flow path in the direction perpendicular to the flow direction of the liquid water is larger than the cross-sectional area of the liquid water flow path in the direction perpendicular to the flow direction in the remaining region of the liquid water. The cross-sectional area of the liquid water flow path in the direction perpendicular to the flow direction of the liquid water flow path can also be referred to as the cross-sectional area of the liquid water flow path in a width direction of the liquid water flow path.

The liquid water flow path is provided along the gas flow paths. Thus, the liquid water such as the water generated by the cell reaction of the single fuel cell can be collected in the liquid water flow path along the gas flow paths, so that the liquid water is less likely to flow into the gas flow paths.

Expanded Region

The expanded region is a region, of the liquid water flow path, in which the cross-sectional area of the liquid water flow path in the direction perpendicular to the flow direction is larger than the cross-sectional area of the liquid water flow path in the direction perpendicular to the flow direction in the remaining region of the liquid water flow path.

The shape of the expanded region may be any shape as long as the cross-sectional area of the liquid water flow path in the direction perpendicular to the flow direction is larger than the cross-sectional area of the liquid water flow path in the direction perpendicular to the flow direction in the remaining region of the liquid water flow path.

The width of the expanded region may be larger than the width of the remaining region of the liquid water flow path. By making the width of the expanded region larger than the width of the remaining region of the liquid flow path, it is possible to set the cross-sectional area of the liquid water flow path in the direction perpendicular to the flow direction in the expanded region larger without increasing the thickness of the fuel cell separator.

The number of the expanded regions in the liquid water flow path is not particularly limited, and may be determined appropriately depending on factors such as the size of the fuel cell separator, the length of the liquid water flow path, and the amount of liquid water such as the water generated by the cell reaction of the single fuel cell.

Gas Flow Path

The gas flow paths of the fuel cell separator are used to supply the reaction gas supplied from the outside of the single fuel cell, for example, the cathode gas or the anode gas, to the gas diffusion layer and/or discharge the gas to the outside of the single fuel cell.

The shape of the gas flow paths may be any shape that allows supply of the reaction gas, such as the cathode gas or the anode gas, which is supplied from the outside of the single fuel cell, to the gas diffusion layer. For example, the gas flow paths may have a serpentine shape.

The gas flow path may have a narrow region having a cross-sectional area of the gas flow path in the direction perpendicular to the flow direction that is smaller than a cross-sectional area of the gas flow path in the direction perpendicular to the flow direction in the remaining region of the gas flow path.

When the gas flow path has the narrow region, a flow velocity of the reaction gas flowing in the narrow region is increased, so that the liquid water such as water generated by the cell reaction of the single fuel cell is easily discharged from the single fuel cell.

The narrow region may be aligned with the expanded region of the liquid water flow path.

Figure 7:
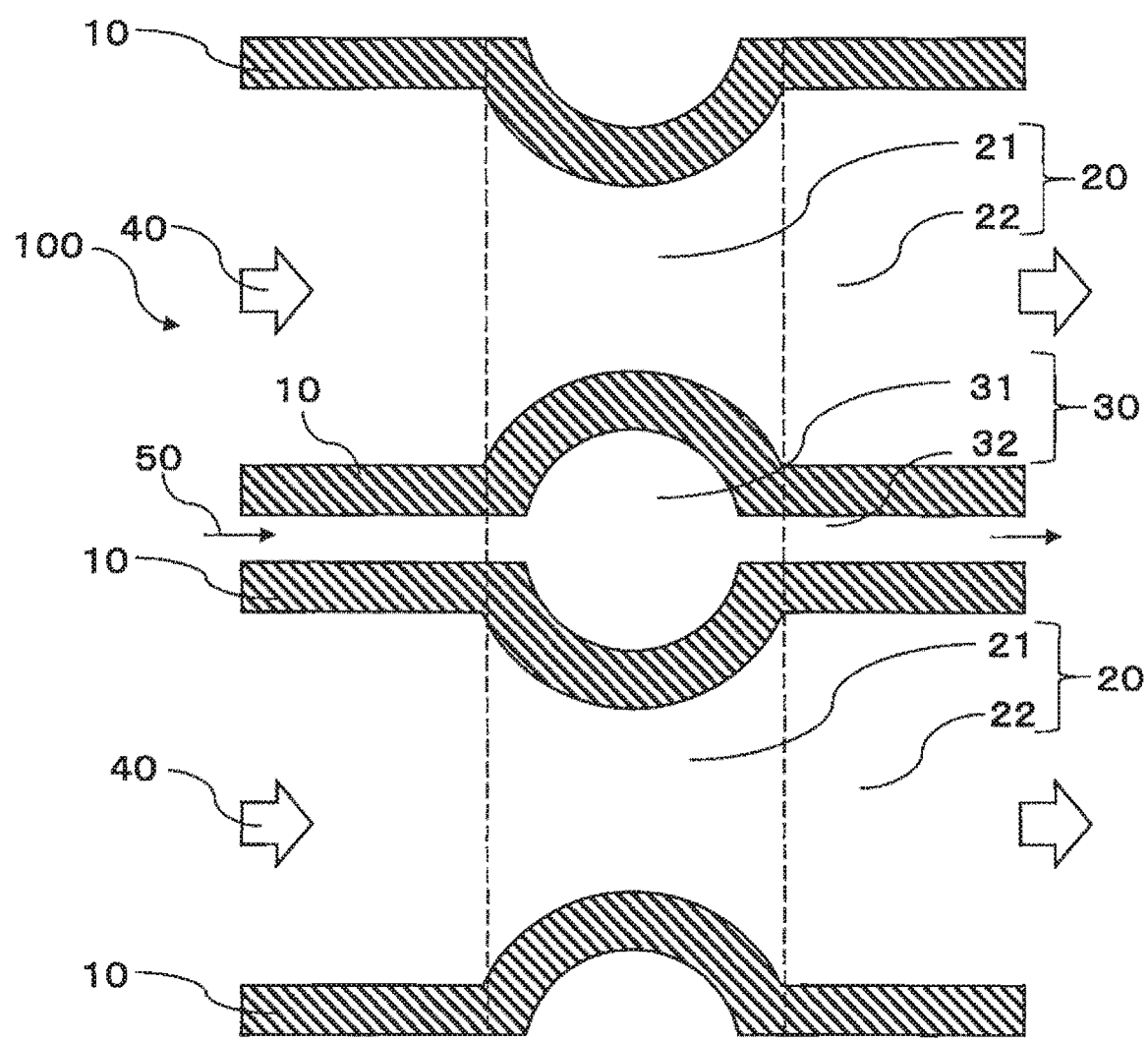
FIG. 7 is a schematic diagram showing a liquid water flow path of a fuel cell separator according to a second embodiment of the present disclosure.

More specifically, the narrow region and the liquid water flow path can be disposed as shown in FIG. 7. In FIG. 7, the fuel cell separator 100 has gas flow paths 20 separated from each other by the ribs 10, and on the surface of the ribs 10 on the gas flow path 20 side, the liquid water flow path 30 provided separately from the gas flow paths 20 along the gas flow paths 20. The liquid water flow path 30 has the expanded region 31 in which the cross-sectional area of the liquid water flow path 30 in the direction perpendicular to the flow direction of the liquid water flow path 30 is larger than the cross-sectional area of the liquid water flow path 30 in the direction perpendicular to the flow direction of the remaining region 32 of the liquid water flow path 30. The gas flow path 20 has the narrow region 21 in which the cross-sectional area of the gas flow path 20 in the direction perpendicular to the flow direction of the gas flow path 20 is smaller than the cross-sectional area of the gas flow path 20 in the direction perpendicular to the flow direction of the remaining region 22 of the gas flow path 20. Further, the narrow region 21 is aligned with the expanded region 31 of the liquid water flow path 30.

Single Fuel Cell

The single fuel cell of the present disclosure is a single fuel cell in which the fuel cell separator of the present disclosure, the gas diffusion layer, an electrode catalyst layer, and an electrolyte layer are stacked in this order. The single fuel cell of the present disclosure has a configuration in which a cathode separator, a cathode gas diffusion layer, a cathode electrode catalyst layer, the electrolyte layer, an anode electrode catalyst layer, an anode gas diffusion layer, and an anode separator are stacked in this order. The single fuel cell of the present disclosure may be a single fuel cell in which at least one of the cathode separator and the anode separator has the configuration of the fuel cell separator of the present disclosure.

Gas Diffusion Layer

Examples of the gas diffusion layer include the anode gas diffusion layer and the cathode gas diffusion layer.

The material of the gas diffusion layer may be any material that can be used for the anode gas diffusion layer and the cathode gas diffusion layer of a fuel cell catalyst. An example of such a material includes a porous body having conductivity. More specifically, examples of such a porous body include a carbon porous body such as carbon paper, carbon cloth, and glassy carbon, and a metal porous body such as metal mesh and foamed metal.

Electrode Catalyst Layer

Examples of the electrode catalyst layer include an anode electrode catalyst layer and a cathode electrode catalyst layer. The anode electrode catalyst layer and the cathode electrode catalyst layer may be layers of a catalyst in which a catalyst metal is supported on a carrier.

The catalyst metal may be any catalyst metal used for a fuel cell catalyst. Examples of such a catalyst metal include Pt, Pd, Rh, and alloys containing these.

The carrier may be any carrier used for a fuel cell catalyst. Examples of such a carrier include a carbon carrier, more specifically, carbon particles made of glassy carbon, carbon black, activated carbon, coke, natural graphite, artificial graphite, or the like.

Electrolyte Layer

The material of the electrolyte layer may be any material that can be used for the electrolyte layer of the single fuel cell. Examples of such a material include a polymer membrane having fluorine-based ion conductivity, more specifically, an ion-exchange membrane having perfluorosulfonic acid and having proton conductivity.

What is claimed is:

1. A fuel cell separator comprising ribs, wherein:
the fuel cell separator has a plurality of gas flow paths defined in a first surface of the fuel cell separator that is configured to contact a gas diffusion layer in a fuel cell, the gas flow paths being separated from each other by the ribs; and
the fuel cell separator has liquid water flow paths also defined in the first surface of the fuel cell separator, wherein
(i) the liquid water flow paths and the gas flow paths are configured to contact the gas diffusion layer,
(ii) each of the liquid water flow paths being on a surface of a corresponding one of the ribs,
(iii) the liquid water flow paths being separated from the gas flow paths, and
(iv) the liquid water flow paths extending along the gas flow paths; and
each of the liquid water flow paths has an expanded region having a cross-sectional area that is larger than a cross-sectional area of a remaining region of the liquid water flow path that is a region of the liquid water flow path other than the expanded region, the cross-sectional area of the expanded region and the cross-sectional area of the remaining region of the liquid water flow path each being an area of a cross-section perpendicular to a flow direction of the liquid water flow path.

2. The fuel cell separator according to claim 1, wherein a width of the expanded region is larger than a width of the remaining region.

3. The fuel cell separator according to claim 1, wherein:
- each of the gas flow paths has a narrow region having a cross-sectional area that is smaller than a cross-sectional area of a remaining region of the gas flow path that is a region of the gas flow path other than the narrow region, the cross-sectional area of the narrow region and the cross-sectional area of the remaining region of the gas flow path each being an area of a cross-section perpendicular to a flow direction of the gas flow path; and
- the narrow regions of the gas flow paths are arranged side-by-side with the expanded regions of the liquid water flow paths.

4. The fuel cell separator according to claim 1, wherein the fuel cell separator is a cathode separator.

5. A single fuel cell comprising:
- the fuel cell separator according to claim 1;
- a gas diffusion layer;
- an electrode catalyst layer; and
- an electrolyte layer,
- wherein the fuel cell separator, the gas diffusion layer, the electrode catalyst layer, and the electrolyte layer are stacked in this order.

* * * * *